United States Patent [19]

Robillard

[11] 4,335,302
[45] Jun. 15, 1982

[54] BAR CODE SCANNER USING NON-COHERENT LIGHT SOURCE

[75] Inventor: Jean J. Robillard, Amherst, Mass.

[73] Assignee: R.L.S. Industries, Inc., Elk Grove, Ill. ; a part interest

[21] Appl. No.: 179,754

[22] Filed: Aug. 20, 1980

[51] Int. Cl.³ .............................................. G06K 7/10
[52] U.S. Cl. .................................. 235/462; 250/566; 340/146.3 Z
[58] Field of Search ....................... 235/462, 454, 470; 340/146.3 Z, 146.3 AG; 250/566-568

[56] References Cited

U.S. PATENT DOCUMENTS

| | | | |
|---|---|---|---|
| 3,790,756 | 2/1974 | Graves | 235/462 |
| 4,074,114 | 2/1978 | Dobras | 340/146.3 Z |
| 4,136,821 | 1/1979 | Sugiura et al. | 235/462 |
| 4,226,541 | 10/1980 | Tisue | 250/566 |

Primary Examiner—Donald J. Yusko
Attorney, Agent, or Firm—Sherman & Shalloway

[57] ABSTRACT

A scanner for reading bar codes on labels uses a non-coherent light source 11 below a top window 7 to illuminate a code label passing over the window. A lens system focuses an image of the code label onto a photosensitive diode array 25 and onto a photodetector 37. Signal information from the diode array 25 is provided to a code reading circuit 41 when bars on the code label are aligned substantially perpendicular to the array 25. When the bars are not aligned substantially perpendicular to the array 25, the photodetector 37 provides the code reading circuit 41 with pulse signals, transmitted when successive bars on the label pass into focus over the photodetector 37.

The system avoids the use of coherent (laser) light and is suitable for reading UPC labels on packages being passed over the window 7.

15 Claims, 8 Drawing Figures

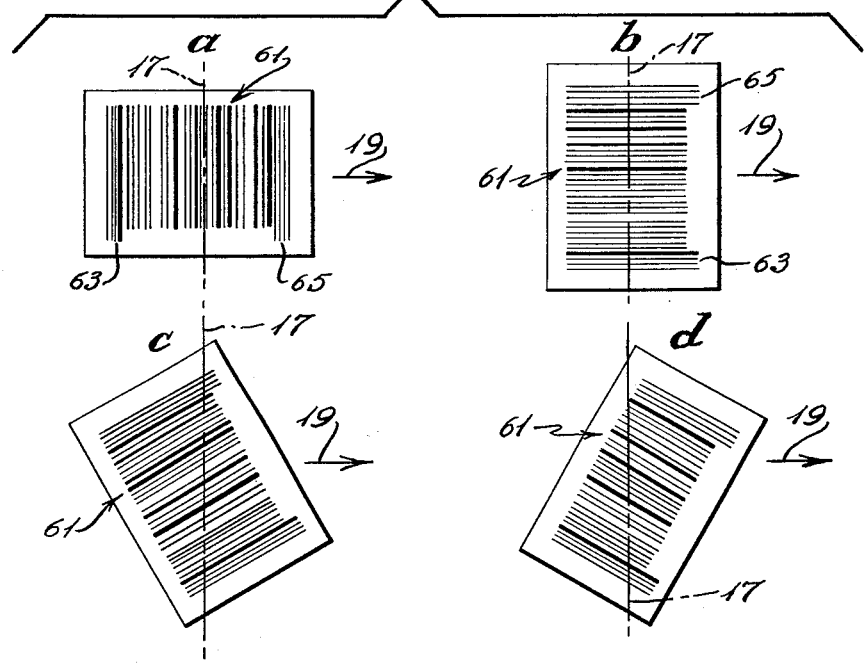
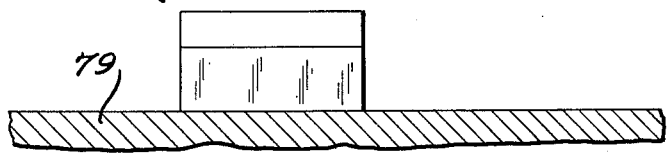
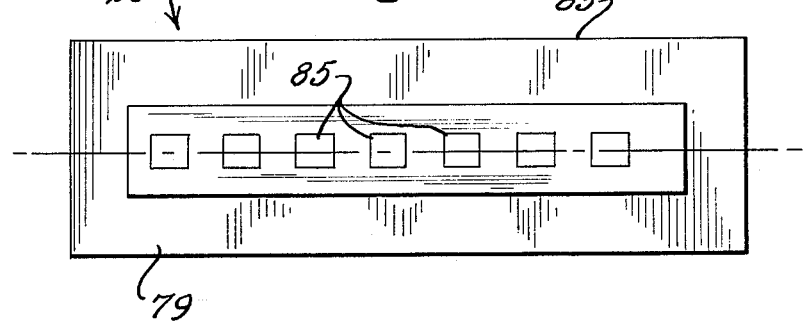

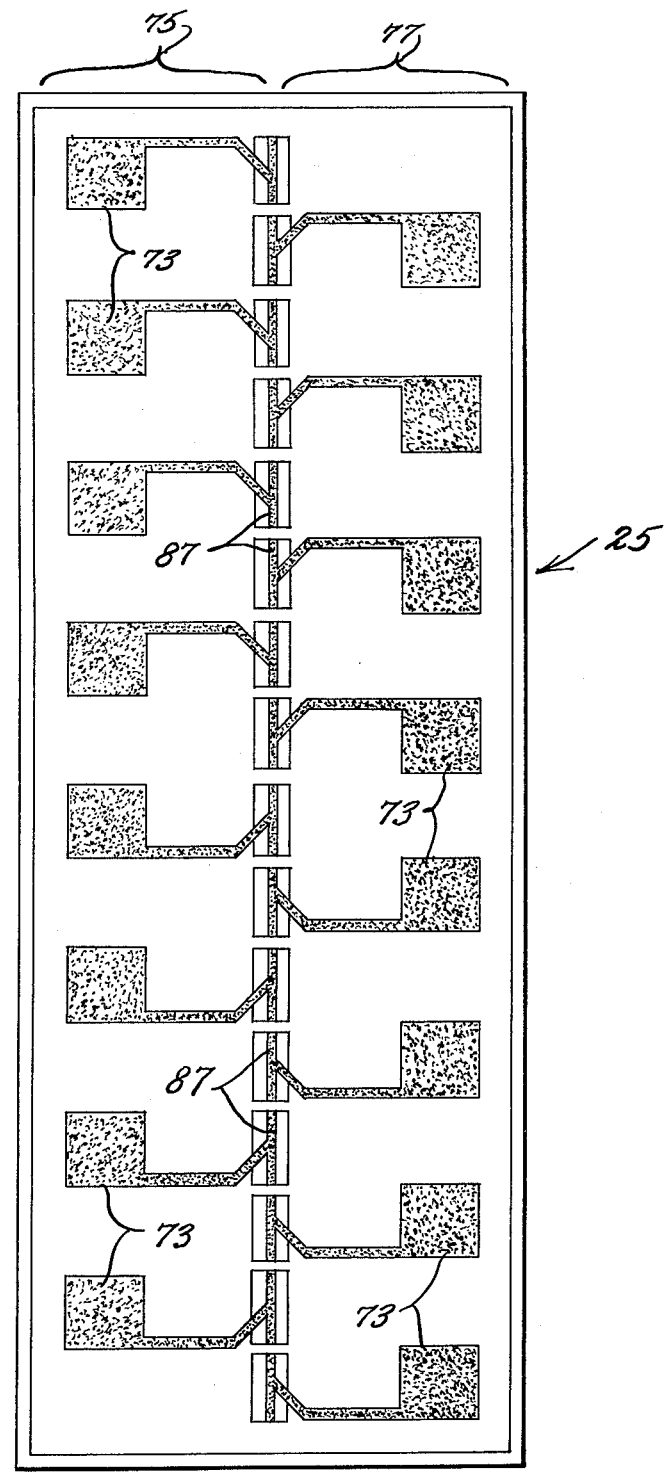

$$\frac{L(\lambda)}{L(\lambda = 650\,nm)} = F(\lambda)$$

$$L(\lambda = 650\,nm) = 0{,}55\,W\,cm^{-2}\,str^{-1}$$

OPERATING ZONE

BAR CODE SCANNER USING NON-COHERENT LIGHT SOURCE

BACKGROUND OF THE INVENTION

1. Field of the Invention

This invention is directed to a bar code scanner of the type used to read bar codes such as U.P.C. bar codes on package labels. These bar codes are used to provide product information to data processing machinery at a point of purchase so that products chosen by a consumer-purchaser may be moved across a horizontal scanning window. The data processing machinery determines the cost of a product by comparing the bar code on the product's label with a list stored in a memory bank. The information stored in the memory bank may include information from a universal commercial list provided for several sale outlets as well as additional information provided at individual sales outlets. Such additional information may include information regarding non-uniform packaging, such as meat and produce at a supermarket. The most common application of this system uses the U.P.C. bar code.

The U.P.C. bar codes are established by the Uniform Grocery Product Code Council which distributes codes which may be used by various wholesale manufacturers. In addition to these designated codes, an individual retailer may apply individual codes, such as those used for products which are not uniformly packaged. The use of the U.P.C. system not only reduces labor cost at the point of sale, but also enables other data processing to be provided. For example, the system is used as a part of a continuing or "perpetual" inventory control, thus necessitating inventory checks only for reduction in inventory outside of the scanning system such as non-scanned sales, breakage, theft and other shrinkage. Additionally, time-of-day sales information and other previously difficult to obtain information may be provided by the system. With the possible development of improved pricing indicators on the market display shelves, it may be possible to further eliminate the step of placing price labels on package labels, thus further reducing labor costs.

When products are passed over a code-scanning window, an approximate alignment of the code label is made by the checkout girl with the center of the scanning window. The scanner must then locate the beginning and end of the encodation on the label, regardless of the direction that the code label is oriented along the surface of the scanning window. Thus, a package carton may be moved across the window with the U.P.C. bar code label aligned in any direction along the lower surface of the carton, provided that the label faces downward and is in the general vicinity of the center of the scanning window. Thus, while a reverse orientation of the bars on a bar code may be interpreted by data processing circuitry, it is also necessary that the scanner be able to read the bars when they are aligned transversely, longitudinally or at an angle to the direction that they are to be passed across the window.

2. Description of the Prior Art

Bar code readers of the type used in supermarkets presently employ a coherent (laser) light source and a mirrored drum in order to scan bar codes. Typical devices using this system are described in Jeffery, et al., U.S. Pat. No. 4,043,632, Tofoya, U.S. Pat. No. 4,057,784 and Nickel, U.S. Pat. No. 4,093,865. The mirrored drum must be rotated at a fairly high speed, such as 1800 rpm (U.S. Pat. No. 4,057,784) or 3500 rpm U.S. Pat. No. 4,043,632). Further optics may also be required such as the vibrating mirror assembly of U.S. Pat. No. 4,057,784.

The use of a coherent light source creates problems with regard to maximum allowable emissions, due to the ability of the coherent light source to project a light beam which does not have a significantally reduced intensity as the human eye is moved away from the (coherent) light source. As mentioned in U.S. Pat. No. 4,057,784, federal regulations from such agencies as the Bureau of Radialogocal Health (BRH) must be met. As stated in the patent, there are sometimes difficulties encountered in maintaining sufficient power to obtain an adequate reflection from a low contrast label while keeping the optical emissions of the device at a safe level.

It is expected that various local governments will further restrict the use of laser devices in public areas, in part due to a lack of trust by the local governments for the ability of the federal government to safeguard their citizens from radiation hazards.

U.S. Pat. No. 3,758,753 to Myer shows a code-reading device in which the illuminating source may be comprised of conventional lamps. An array of optical bundles with associated photo multipliers is used, in addition to a first detector which is included for the purpose of providing an output capable of reading various codes. However, the device requires that an optical system rotate at 120 rpm and that a rotating mirrored drum turn at 1800 rpm. It should also be noted that the system is adapted to a label in which a timing reference strip along the length of the coded label is used in order to reference different codes located below the timing reference.

U.S. Pat. No. 4,074,114 to Dobres shows an optical scanner which apparently uses neither a rotating drum nor a coherent light source. While a certain "operating range" is described, it is necessary that the code reader be aligned in a certain direction relative to the code to be read.

Various arrangements have been proposed for producing optically sensitive arrays. For example, U.S. Pat. No. 3,785,753 (cited above) indicates the use of a series of photo multipliers. U.S. Pat. Nos. 3,787,823, 3,860,915 and 3,993,888 also disclose optical elements arranged in matrices, or arranged for the purpose of scanning. However, none of these patents discloses the use of such an array for the purpose of scanning a label in a random orientation without the use of rotating objects.

Accordingly, it is an object of this invention to provide a scanning system which eliminates the drawbacks of prior art scanning devices. These drawbacks include the requirement for moving parts such as a rotating drum, the use of a coherent light source, as well as the requirement that the bar code be aligned in any direction for reading by a scanner.

It is a further object of this invention to provide a label scanner which does not require the use of moving parts, while permitting a label to be passed across the scanner in any direction.

It is a further object of this invention to provide a label scanner which does not use a coherent light source and yet may be used in an environment where labels are passed across the scanner with a bar code aligned in random directions.

It is a further object to provide a bar code scanner in which a non-coherent light source is used and the bar code is focused by stationary optical means to the necessary detectors so that the bar code can be read regardless of the alignment of an encoded label as it is passed across a viewing window.

It is a further object of this invention to provide a bar code label scanner having a stationary window which does not require the use of a coherent light source or the use of moving parts such as a rotating mirrored drum, and which permits a label to be passed over the window in any axial alignment, provided that the label is placed face-downward.

SUMMARY OF THE INVENTION

These and other objects are met by providing a horizontal window-type scanner in which a non-coherent light source is directed to a product label and the image of the product label is projected through a first lens to a slit. The image passed through the slit is then focused through a second lens both to a linear photodiode array and to a single point light detector. Thus, when the bars are aligned so that all of the bars are simultaneously passed through the slit, the diode array provides information to the data processing circuitry indicating the size and spacing of the bars. When the label is passed over the window so that consecutive bars are focused through the slit in a sequence, the point photodetector provides the data processing circuitry with information regarding the duration sequential bars are passed into focus and the length of time that each bar is passed into focus. When the bars are passed over the windows at an obtuse angle, the point photodetector provides a timing signal so that information provided by the diode array may be processed by the data processing circuitry. Thus, a bar code can be read by the data processing circuitry, regardless of the angle at which a label containing the bar codes is passed over the viewing window.

In one aspect, this invention provides a label scanning apparatus in which a non-coherent light source located under a top surface window reflects against a label and a first lens focuses an image from the label to a longitudinal slit located below the top surface and the lens. An opaque blocking screen surrounds the first lens to block light not passing through the top surface window and the first lens. A second optical lens then focuses the image passed through the slit past a partially-silvered mirror onto a diode array and onto a separate photocell. The image passed to the photocell is focused by a third lens in order to align the image of the label with the photocell. The information provided by the diode array and the photocell, is registered and input into data processing circuitry which then reads the labels so that they may be compared to a standard U.P.C. label format and with a list of specific labels stored by the data processing circuitry.

In a further aspect, this invention provides a method for reading bar code labels in which an image of a label passed over a viewing surface is focused onto a slot. The image focused on the slit is then focused onto a diode array containing photodiodes and a substantial portion of the image appearing at the slit is focused onto a photocell. The diode array provides data processing circuitry with information concerning the image pattern focused onto the diode array, and the photocell provides data processing circuitry with a timing signal. The data processing circuitry uses this information to provide an output which is compared to a standard code format and with specific code formats.

In a further aspect of the invention, an initial timing signal is provided by additional photo-sensitive diodes which measure the velocity of a package containing the label prior to the package passing over the viewing window. These additional detectors can further be used to indicate that a product is being passed over the viewing window and should be read. The indication is compared with a readout by the data processing circuitry to indicate the successful or non-successful reading to provide a start signal to the data processing circuitry and to provide the operator with a "go" or "no go" signal.

BRIEF DESCRIPTION OF THE DRAWINGS

FIGS. 3 show various orientations of bar codes moving across a viewing window in accordance with the invention.

FIG. 4 is a top view of the diode array used with the preferred embodiment of the invention.

FIGS. 5 and 6 are side and top views schematically showing the construction of the diode array according to the invention.

DETAILED DESCRPTION OF THE PREFERRED EMBODIMENT

Figure 1:
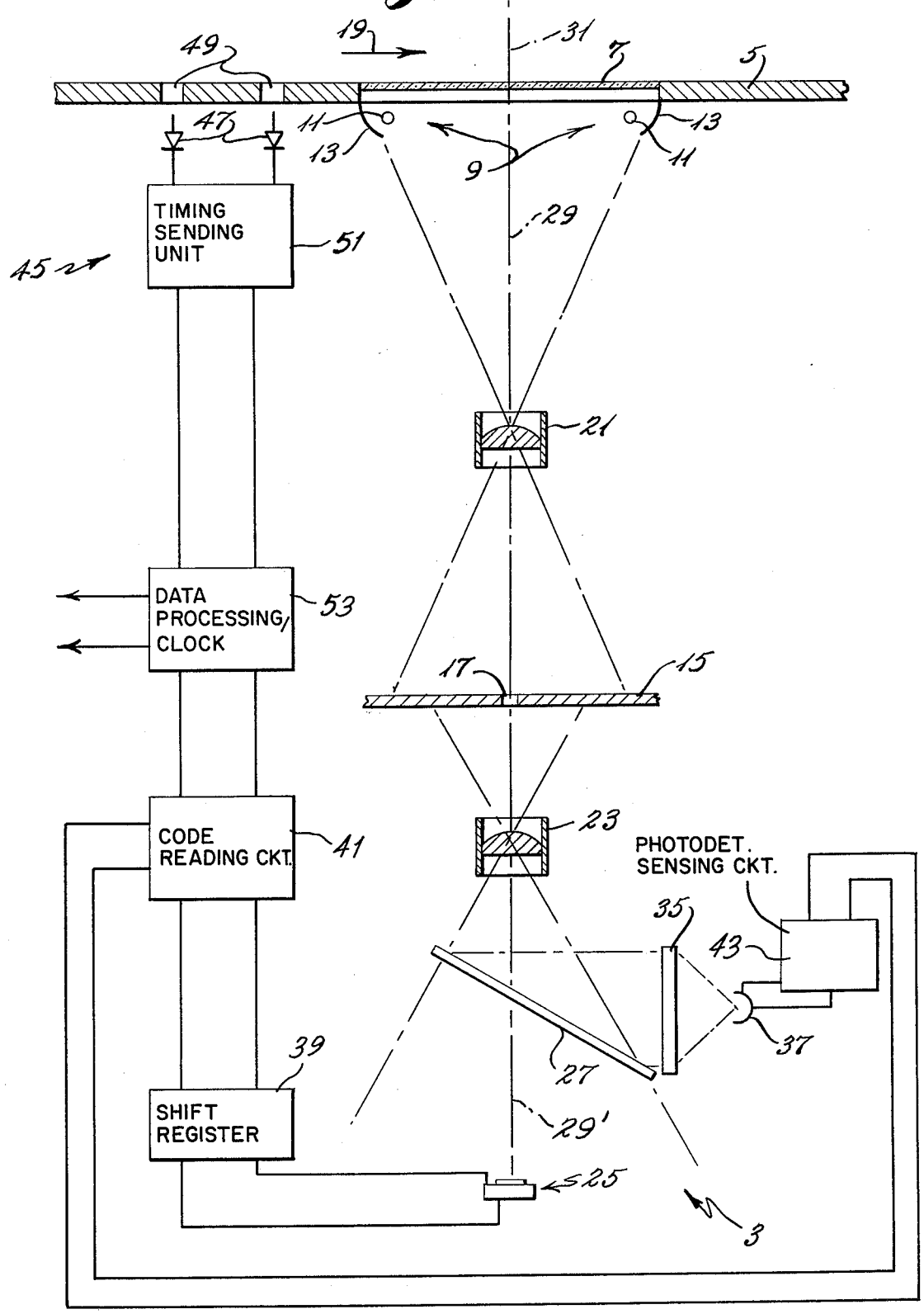
FIG. 1 is a schematic drawing representing the optical arrangement of the scanner according to a preferred embodiment of the invention, showing the electronic circuitry arrangement in block form.
Figure 2:
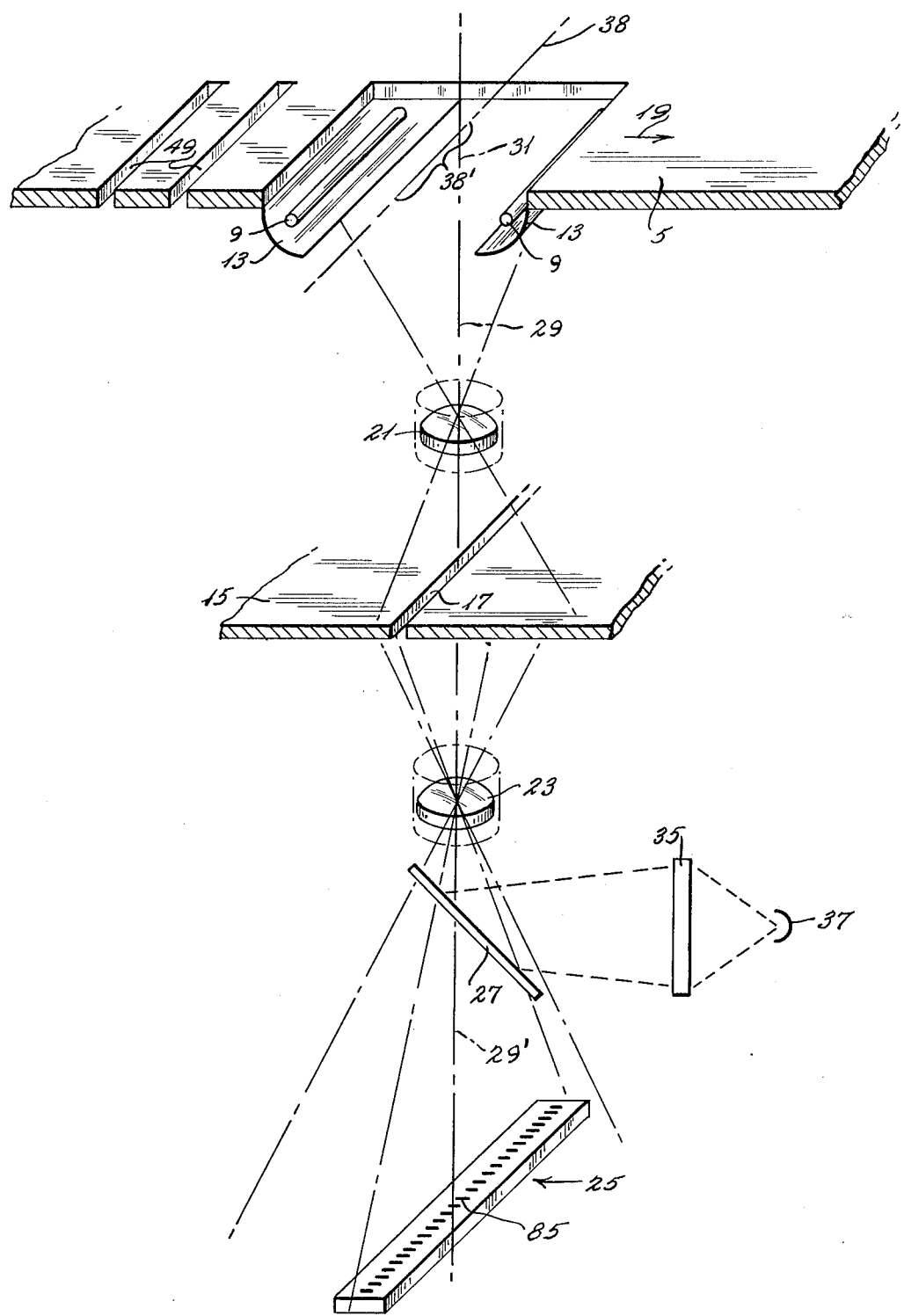
FIG. 2 is a perspective cross-sectional view of the optical elements of the preferred embodiment of the invention.

Referring to FIGS. 1 and 2, the optical components 3 are located at and below a top surface 5 of a point of purchase checkout counter. Flush with the top surface 5 is viewing window 7 made of optically transparent material such as tempered glass. The viewing window 7 combined with the top surface 5 forms a continuous surface on which products such as groceries are moved across, with their U.P.C. bar codes face-downward, in the customary manner by the operator.

Below the viewing windows are mounted a pair of lamps 9 which may comprise xenon light tubes 11 and associated reflectors 13. The lamps 9 transmit light through the viewing windows 7 thus illuminating the lower portion of an object (not shown) which may be placed on the viewing window 7 at any given time.

Located directly below the viewing window 7 is a lower surface 15 containing a slit 17 therein. The lower surface 15 and the slit 17 are parallel to the top surface 5 and therefore are generally horizontal. The slit 17 is cut perpendicular to an intended direction of travel of grocery products indicated by arrow 19.

Located between the slit 17 and the top surface 7 is a first optical lens 21. The first optical lens 21 is chosen with parameters such that an image of an object located just above the top surface 7 is projected into the slit by the lens 21. The lower surface 15 is optically opaque and the slit 17 is, of course, optically transparent.

A second optical lens 23 project the image appearing at the slit downward, focusing it at a diode array 25.

Located between the diode-array 25 and the second optical lens 23, is a partially silvered mirror 27.

The first optical lens 21, the slit 17 and the second optical lens 23 are arranged collinearly along a vertical axis 29. The vertical axis 29 intersects the viewing window 7 at a center point 31. The partially silvered mirror 27 is placed at an angle to the vertical axis but is parallel with the slit 17. Therefore, light passing through the partially silvered mirror 27 is shifted in accordance with the index of refraction of the partially silvered mirror 27, thereby forming a shifted vertical axis 29.

The diode array 25 is a linear array of photosensitive diodes, as will be described later. The diode array 25 is arranged with its diodes in a row parallel to the slit 17 and positioned so that the shifted vertical axis 29' passes through the center of the diode array 25.

A third optical lens 35 is located so as to focus light passing through a slit 17, as reflected by the partially silvered mirror 27, upon a photodetector 37. The photodetector 37 may comprise any electrically photosensitive element, such as a phototransistor.

Thus, it can be seen that the image of a portion 38' of a line 38, located on the viewing window 7, parallel to the slit 17 and passing through the vertical axis 29, is transmitted by the first and second lens 21, 23, through the slit 17 and the partially silvered mirror 27 onto the diode array 25. It can also be seen that an image of the portion 38', as appears at the slit 17, is focused by the second optical lens 23 against the partially silvered mirror 27 onto the third optical lens 35 which converges the image of the portion 38' of the line 38 appearing at the slit 17 onto the photodetector 37.

The diode array 25 transmits a signal which corresponds to the amount of light incident upon each portion of the diode array 25. This signal is registered at the shift register 39 which is addressable by a code reading circuit 41. The phototransistor 37 provides a signal to a photodetection sensing circuit 43 which provides a signal indicating the amount of light impinging upon the photodetector 37 to the code reading circuit. Thus, information sufficient to read an entire label, as the label is passed over the center part 31 of the viewing window 7, is received by the code reading circuit as a result of the images produced on the diode array 25 and the photodetector 37.

When only a portion of an image of the coded label appears on the digital array at any given time, it is necessary to measure the duration of pulses of light as appear on the photodetector 37. Thus, the information necessary for reading a code consists of the information provided by the diode array as well as a timing pulse provided by the photodetection sensing circuit 43. Accordingly, it is useful to provide an initial velocity input into the code reading circuit.

Accordingly, an initial timing circuit 45 is provided comprising a pair of photosensitive timing diodes 47 located below a pair of transparent portions 49 in the top surface 5. The transparent portions 49 are located so that an object moving in the intended direction of travel 19 passes over the transparent portions 49 in a timed sequence at the initial velocity of the object. A timing sending unit 51 is connected to the photosensitive timing diodes 47 and provides a signal representative of the initial velocity of an object to pass over the viewing window 7. The timing signal is transmitted through a data processing and clock circuit 53 to the code reading circuit 41 so as to provide the code reading circuit with an initial velocity reading. The code reading circuit 41 then provides the data processing circuit 53 with a code reading which the data processing circuit 53 compares to acceptable code parameters. When acceptable code parameters are indicated, the data procession circuit 53 transmits the code reading to a computing means which compares the code reading with specific codes of various products.

The signal from the timing sending unit 51, fed to the code-comparison circuit, provides a "start" signal for the potential reading of a code label. If a label is successfully read, the computing means provides the operator with a "yes" signal and processes the information, as, for example, a sale.

If, on the other hand, no successful reading is obtained, the computing means provides the operator with a "no" signal, informing the operator that a label has not been read by the scanning apparatus.

Referring to FIG. 3, the photodiode array is capable of reading labels arranged along the viewing window 7 with bar codes 61 arranged approximately perpendicular to the intended direction of travel 19, as shown in FIG. 3a, perpendicular to the slot 17, as shown in FIG. 3b, or neither parallel nor perpendicular to the intended direction of travel 19, as shown in FIGS. 3c and 3d. The apparatus is capable of reading bar codes in either of these cases.

In a case in which the sequential bars are parallel to the direction of travel, as shown in FIG. 3, an image of a portion of each bar is simultaneously focused onto the diode array, thus providing the code reading circuit 41 with a complete read-out of a code from the shift register 39. The code reading circuit then transmits this read-out to the code comparison circuit 53 which provides the computing means with a code.

If the bars are arranged parallel to the slit 17 as shown in FIG. 3a, or nearly parallel to the slit 17, as shown in FIG. 3c, then the resulting image provides a series of pulses which is detected by the photodetector 37. The photodetection sensing circuit 43 provides an output of pulses of varied time duration which the code-reading circuit detects. Since each bar code 61 is provided with a "start" encodation 63 and a "end" encodation 65, appropriate pulses that would be produced by the "start" or "end" encodation 63 or 65, at the initial velocity as detected by the initial timing circuit 45 is sensed by the code-reading circuit 41 as the beginning of a code is being sensed by the photodetection sensing circuit 43. This code is transmitted by the code-reading circuit 41 to the data processing circuit 53 which transmits the code to the computing means.

In the case of the bar code 61 passing over the viewing window 7 at an acute angle to the intended direction of travel 19, as shown in FIG. 3d, "start" or "end" endodation 63 or 65 will first appear in the shift register and will result in a signal from the photodetection sensing circuit 43 representative of the pulses moving in a staggered timing reduced from the initial timing signal provided by the timing sending unit 51 so that: (pulse length as read)=(pulse length with bars $\perp$ to direction of travel 19)$\times$(sine of the angle between bars and the direction of travel 19). The code reading circuit 41 then registers the image of the bar code 61 as passing over the diode array 25 sequentially from one "start" or "end" encodation 63–65 to the other encodation 63–65 at a speed represented by pulses provided by the photodetection sensing circuit 43. The code reading circuit 41 then provides the data processing circuit 53 with a code which the comde comparision circuit provides to the computing means.

Figure 7:
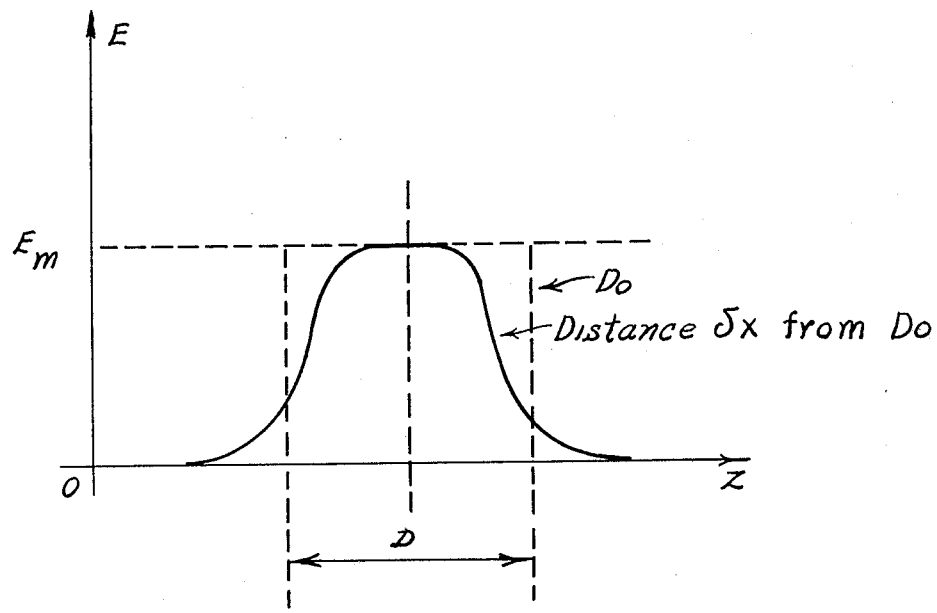
FIG. 7 is a graphic representation of a light reflected on a slit by a white surface on a label-bearing object.

Referring to FIGS. 4–6, the diode array 25 is made by the juxtaposition of several terminals 73 on which an elemental array is integrated. The terminals 73 are placed in alternate rows 75, 77 to avoid edge losses of resolution. They are mounted on a berylium oxide substrate 79 with a silver solder. The height H (see FIG. 5) should not exceed 300 with possible variations of 100μ from one terminal 73 to another 73, but, for a given terminal 73, the variation in the height H should be ±15μ. The position of the various terminals along the common axis 81 is shown in FIG. 7. The array 25 should be positioned by reference to the center of the substrate with:

$$Y = 500\mu \pm 200\mu$$

where Y is the distance between the lengthwise edge 83 of the substrate 73 and the array 25. However, for a given array, the precision ΔY should be:

$$\Delta Y = \pm 15\mu$$

over the length of the elemental array. The width of the substrate is 1.25 cm.

The preferred size of an elemental photodiode window 85 is 55μ±3μ, the spacing in between two adjacent windows 85 is 20μ±3μ.

Figure 8:
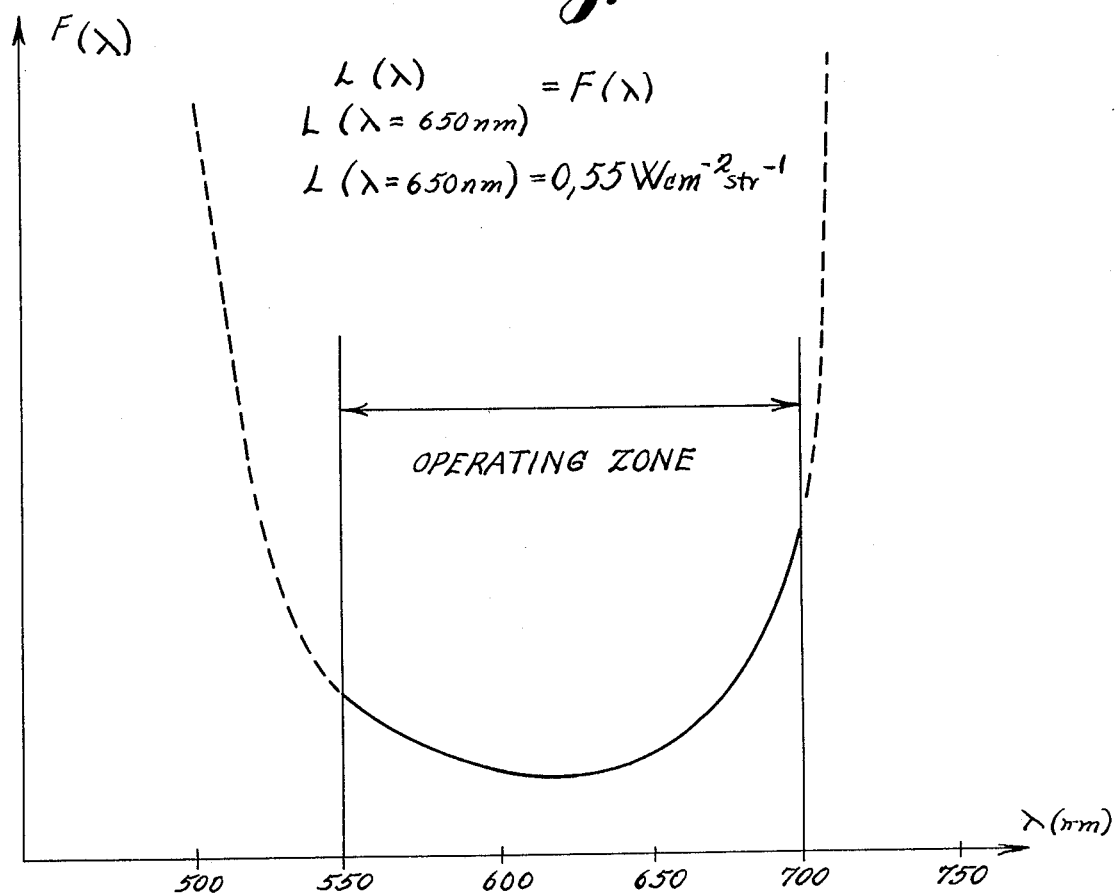
FIG. 8 is a graphic display of the variations of sensitivity of the diode array with wavelength of driving pulses provided to the display.

Referring to FIG. 8, for each driving pulse, each element 87 of the array 25 should provide a current proportional to the illumination on its surface. The sensitivity of each element is 3×10 A/lm at λ=650 nm. Thus, FIG. 8 shows the variations of sensitivity with the wave length (λ).

Operation

The system is made to operate in two modes depending on the orientation of the code 61 with respect to the slit 17. Referring to FIGS. 3, if we take a reference axis parallel to the slit 17 and call it, respectively, L and l, the length and width of the code 61, the two modes of operation will be characterized by three angle regions:

0 to Arctg $\frac{1}{L}$ (FIG. 3b)  (1.)

Arctg $\frac{1}{L}$ to 2π − Arctg $\frac{1}{L}$ (FIGS. 3a, 3d)  (2.)

2π − Arctg $\frac{1}{L}$ to 2π (FIG. 3c)  (3.)

The first mode corresponds to cases 1 and 3 above and the second mode corresponds to case 2.

In the first mode (cases 1 and 3), the bars of the code 61 are either perpendicular to the slit 17 or tilted at an angle not exceeding Arctg (l/L) which corresponds to the diagonal of the code 61. Under these conditions, there will always be a time $t_O$, during the motion of the code bearing object when all the bars of the code 61 will be viewed through the slit 17. If that time $t_O$ includes at least one scanning cylce of the diode array 25, the code will be registered.

In the second mode (case 2), the bars of the code 61 are either parallel to the slit 17 or tilted at an angle not exceeding ±−Arctg (l/L). In this case, not all bars of code 61 can be viewed through the slit S at the same time and use is made of the photodetector 37 to read the code 61. During its motion, the front edge of the code bearing object is first obstructing one transparent portion 49 and the other, thereby producing two pulses respectively from the photosensitive timing diodes 47. These pulses will be used to open and close a flip-flop circuit in the timing sending unit 51 and form a larger pulse whose width will provide a time base for comparison with the pulses produced in the photodetector 37 by the passage of the bars through the slit 17.

The characteristics of the system will depend upon the mode used. These characteristics should therefore have two values corresponding to each case and, as the main characteristic, the more favorable should be retained.

FIG. 1 shows the interrelation of the various functions of the system. The diode array 25 receives the image of an object containing a label through the viewing window 7. The object is lighted by the lamps 9.

The first optical lens 21 porjects an image through the slit 17 and the second optical lens 23 onto the diode array 25 and projects light reflected from the object through the slit 17, against the partially silvered mirror 27, through the third optical lens 35 onto the photodetector 37. Each element 87 in the diode array 25 is individually scanned by the shift register 39. The signal received from each element 87 of the array 25 are processed in the code reading circuit 41. The initial timing circuit 45 measures the initial velocity of the object and provides a time base to process the signal in the photodetector 37. The velocity of the image on the array varies with the cosine of the reference angle ∝ moving a total of X cos ∝ during a 180° exposure sweep. The exposure equation for normal exposure is:

$$B = \frac{1.5 f^2}{S/C\ Tt}$$

where:
B: reflected light from the object (in foot Lamberts)
f: aperture width of slit 17
T: transmittance
S: detector sensitivity
C: filter factor
t: exposure time
W: size of each element 87
v: motion velocity
d: distance of the label to the plan of the window
$\left. \begin{array}{l} k \\ l \end{array} \right\}$ coefficients depending of the optics: $k = 85$
$l = 4$ The exposure time is determined as a function of the object velocity on the window and can be expressed by:

$$t = \frac{Wk\,(d+1)}{27.9\,v}$$

The exposure equation can then be rewritten as:

$$B = \frac{41.85\ f^2 vc}{ST\,w\,k\,(d+1)}$$

In the preferred embodiment, the aperture width F can vary from 0.2 to 3.5, the detector element 87 size W can vary from 0.015 mm to 0.025 mm, the detector sensitivity S thus can vary from about 25 to 1000 amperes per foot-lampert per M² and the filter factor C from 2 to 10.

Therefore, a great many possibilities exist for solving the exposure equation. Practically, a simple logic removes the ambiguity. The maximum velocity for the object will depend on the light available and the label size. The filter factor C is primarily selected on the basis of ambient light conditions. These become fixed inputs into the exposure control. In all registration, it is desirable to use as fast an exposure speed as possible in order to reduce the dependency of the resolution to the orientation of the label with respect to the moving direction of the object.

The signal amplifier, integrated with the scanning circuitry, accepts an exposure signal that is in accordance with:

$$E_i = K \log_2 (I/I_o)$$

where:
- $E_i$: is the exposure signal
- K: the voltage produced by the reference illumination value Io
- I: the diode array illumination in foot candles
- Io: reference illumination value.

This signal is balanced by a feed-back signal that is obtained through a reference voltage and a potentiometer. The feed-back signal will be automatically modified by the V signal given by the timing sending unit 51.

While it is possible to control the exposure by optical means, such as a diaphragm or an adjustment for the width of the slit 17, operational adjustments may also be made by modifying the sensitivity of the circuitry as, for example, the photodetection circuit 43 and the input to the shift register 39.

The current from one element 87 of the array can be expressed by:

$$i_m = T \, B \, d_o 1 \delta \lambda \sigma$$

where:
- : brightness of the white background on the label
- T: optical transmission coefficient
- $d_o$: slit width
- 1: slit length
- $\delta$: bar width
- $\lambda$: bar height
- $\sigma$: sensitivity (di/dF) of the array element 87

The variation of signal current due to bar width is:

$$T \, B \, 1 \, \delta \lambda \sigma = (i_m/d_o)$$

In the first made, the size of an element $\delta_{87}$ of the array should correspond to the image of a code bar of width $\delta_1$ in the plan of the array. Thus, if g is the magnification (negative), one should have:

$$\delta_{87} = g\delta_1$$

The scanning frequency of the array is related to the motion velocity of the label bearing object in the following manner: if n is the number of bars on the label, $L_b$ the length of the bar code b, and $L_w$ the length of the window 85 the total number of possible positions of the bars along the length of the window is: $(L_w n/L_b)$ Now, if $t_{87}$ is the time necessary to scan one element of the array and $t_w$ the scanning time for the length of the window 85, then:

$$t_w = \frac{L_w}{L_b} n t_{87}$$

For a good resolution, the window length should be scanned in a time corresponding to the displacement of the label over a distance corresponding to a bar length $\delta_1$. One could then write:

$$\delta_1 = v t_w$$

$$\text{or } v = \frac{L_b}{L_w} \frac{\delta_1}{n t_{87}}$$

$$\text{and } t_{87} = \frac{L_b \delta_1}{L_w n v}$$

or a frequency:

$$N = \frac{\delta_1}{t_{87}} = \frac{L_b \delta_1}{L_w n v}$$

In the second mode, if $\delta_1$ is the width of a bar on the bar code 61, the width of its image in the plan of the slit 17 $\delta_s$ should be such as:

$$g \delta_1 < \delta_s < 2 g \delta_1$$

one should have:

$$v t_{37} = g \delta_1$$

and $$N_{37} = \frac{1}{t_{37}} = \frac{v}{g \delta_1}$$

where $t_{37}$ is the period corresponding to the frequency limit of the phototransistor 37 and g the magnification (negative).

For typical operation with UPS labels, one could make use of the following values:

| Mode 1: | | |
|---|---|---|
| $\delta_{87} = 0.001$ | $L_w = 8$ | $L_1 = 3.76$ |
| $\delta_1 = 0.025$ | n = 95 | v = 200 |

Thus a frequency N is imposed for the scanning of the array. N=0.6 MHz

| Mode 2: | |
|---|---|
| $\delta_s = 0.1$ | g = 4 |
| $\delta_1 = 0.025$ | v = 200 |

For this second mode of operation, a response frequency of $N_{37} = 2$ kHz for the photodetector 37 is sufficient.

In the preferred embodiment, the first optical lens is rated at f 3.5. The f 3.5 lens improves its resolution with aperture reduction. This modifies the statements relating resolution to slit width W. The values indicate a considerable change due to the resolution/aperture relationship of the first optical lens 21 selected. As the resolution continues to rise with brightness f 3.5 is reached at 100 foot Lamberts in this example.

In the case examined, there will be a greater information content when a higher resolution diode array 25 is used and that larger element diode arrays 25 can be used with 1/10 the light required for this other type of array. The existence of an optimum indicates the necessity of determining the elemental size of the diode array 25 to be selected with respect to actual use (label size, ambient light, etc.). Since the behavior is typical, it can be said that, with this system, if there is sufficient light, the smallest element 87 size of the diode array 25 should be used when v is 140 cm per second. At lower velocities the importance of the object motion may become dominant, and the larger element diode array 25 may produce a higher detection ability than the smallest element diode array 25. Similarly, if the error in the motion velocity v is greater than 5% while all resolutions will be lower, the smallest elemental diode array 25 will be more affected, and the optimum detection will occur at a higher illumination level.

The previous discussion was limited to the axial case (when the optical axis meets the array). Any departure from this condition rapidly becomes more complex. In these oblique considerations, the resulting effect can be evaluated by examining the following equation:

$$v_\alpha = \frac{vF}{k(d+1)} \frac{\cos \cdot \left(\theta \pm \frac{\alpha}{2}\right)}{\cos \cdot \frac{\alpha}{2}}$$

where:
v = image velocity on the array
F = focal length
$\theta$ = angle between the optical axis and the position of the array
$\alpha$ = the angle of departure from the optical axis.

Equation (14) can be expended by trigonometric identities to:

$$v_\alpha = \frac{vF}{k(d+1)} \left(\cos \cdot \theta \pm \sin \theta \operatorname{tg} \frac{\alpha}{2}\right)$$

This can be compared to the expression for the velocity at the optical axis $v_a$:

$$v_a = \frac{vF}{k(d+1)} \cos \theta$$

Thus, the error in velocity $v_\Delta$ is:

$$v_\Delta = v_\alpha - v_a$$

or:

$$v_\Delta = \pm \left(\sin \theta \operatorname{tg} \frac{\alpha}{2}\right) \left(\frac{vF}{k(d+1)}\right)$$

The maximum ($\alpha/2$) in this proposed system is of a value of 5% error will occur at the extremities of the window 7. The data indicated is for a specific case, but it serves to illustrate the point that the narrow slit width W abates the errors in position to the point where resolution rises as $\theta$ increases since the effect of velocity diminishes even though the percent error increases. Where a smaller element 87 diode array 25 is used, a larger slit opening 17 is required as the resolution actually decreases since the quantitative effect of motion increases with $\theta$ almost the whole format angle.

In this case, the resolution difference is such that, even with the additional degradation of the wider slit, a small element diode array 25 offers better resolution than a larger element diode array 25.

Degradation due to distortion was not considered in this example, but it could almost equal the resolution of the larger element diode array 25.

The system is designed to provide equivalent resolution in the reading of the label over the surface of the 20×5 cm window. With 5% allowance for separation between the bars a 10% allowance for overlap, the effective coverage along the array axis using the actual optics, for an array of 17 would be:

$$d = 0.115\ h$$

Thus, at a depth of 4 cm, the length of diode array 25 covered would be 7 mm. This changes proportionally as the depth becomes greater or less.

On the actual design, the angle between the vertical from the diode arrays 25 and the extremities of the window 7 is 90 degrees each side of this vertical. If we consider a flat object where the surface containing the label could practically be considered the same as the window 7, the distance from the middle of the diode array 25 to the extremities of the image at the window 7 would then be:

$$D = \tfrac{1}{2} \sqrt{4h^2 + L_w^2}$$

This is, of course, for a flat surface. However, this is not the normal case. The surface containing the label will often be curved or at a slope with respect to the base in contract with the window 7.

If we consider a slope of X% or an equivalent curvature the angle $\theta$ necessary to view the label from the diode array 25 will be:

$$\theta = \operatorname{Tg}^{-1}(0.01\ X)$$

From this we can determine the depth of field necessary to register a label on a curved part or on a slope of an article.

The system will be designed and constructed to meet the applicable provisions of pertinent specifications for design, performance, interchangeability, reliability, quality control, component selection, environment, engineering drawings and records and shipment. The proposed system can be used in supermarkets or other public places subject to normal field handling by personnel at the level of training customarily used for this type of equipment. Special training and tools will not be required for the operational use.

While a preferred embodiment of the system has been shown and described, it is expected that modifications to the system can be made within the scope of the inventive concepts herein described.

What is claimed is:

1. A label-scanning apparatus comprising:
   (a) a top window at a top surface level;
   (b) a non-coherent light source below the level;
   (c) an optically opaque lower surface, located below the top surface, having a longitudinal slit therein, the slit being transparent to light;
   (d) a first optical lens located between the top surface and the lower surface, the lens adapted to focus an image along a horizontal line on a package label resting on the top surface into the slit;

(e) a diode array located below the lower surface, the array having a plurality of photodiodes aligned longitudinally in a single row, the photodiodes changing their resistances proportionally to the illumination on their surfaces, the diode array being formed as an integrated circuit;

(f) a photocell;

(g) a partially transparent mirror located below the lower surface, the partially transparent mirror being adapted to reflect a portion of light impinging thereon and to transmit a remaining portion of light impinging thereon;

(h) a second optical lens, located between the lower surface and the partially transparent mirror, the second optical lens cooperating with the partially transparent mirror to focus the image focused on the slot by the first optical lens onto the diode array and to transmit a portion of the image focused on the slot to the photocell;

(i) a third optical lens located between the partially transparent mirror and the photocell, the third optical lens cooperating with the second optical lens and the partially transparent mirror to focus a portion of the image focused on the slit by the first optical lens onto the photocell;

(j) a shift register operable to register the light sensed by the diodes on the digital array;

(k) a photocell-monitoring circuit responsive to the light sensed by the photodetector;

(l) a data processing means, the data processing means receiving signals from the shift register and the photocell monitoring circuit, and producing an output, the output corresponding to a pattern of the image along the horizontal line of the package label and the change of the image of the package label as the package is moved along the top surface provided that the pattern coincides with predetermined code parameters.

2. The apparatus of claim 1 further comprising speed detection means, the speed detection means providing a timing signal for the data processing means.

3. The apparatus of claim 2 wherein the speed detection means comprises an elementary detection means to determine an initial velocity of a package as it is moved across a slit and a rate of change detector responsive to the rate of change of the signals from the photocell monitoring circuit.

4. The apparatus of claim 3 wherein the photocell is provided as a separate unit from the diode array.

5. The apparatus of claim 3 wherein the non-coherent light source is located adjacent to and below the top surface and further is located above the first optical focusing lens.

6. The apparatus of claim 5 wherein the light source is a pair of xenon light tubes.

7. The apparatus of claim 2 wherein the speed detection means comprises a pair of elementary detectors to determine an initial velocity of a package moving along the top surface and a timing circuit, the timing circuit being responsive to the change in the output of the shift register.

8. The apparatus of claim 4 wherein the partially transparent mirror is a partially-silvered mirror.

9. The apparatus of claim 8 wherein the diode array is provided with gallium-arsenic photodetector diode elements.

10. The apparatus of claim 8 wherein each photodiode element has a window size which is at least twice the spacing between two adjacent windows but not greater than four times the spacing between the windows.

11. The apparatus of claim 8 wherein the first optical lens is a convex lens, the second optical lens is a convex lens and the third optical lens is a convex lens.

12. The apparatus of claims 3 or 4 wherein the elementary detectors comprise a pair of holes, each hole having an initial detection photocell therein so that the initial velocity detection is made by the velocity at which the package passes over the first and second holes.

13. A label-scanning apparatus comprising:

(a) a top window at a top surface level;

(b) an optically opaque lower surface, located below the top surface, having a longitudinal slit therein, the slit being transparent to light;

(c) a first optical lens of the convex type located between the top surface and the lower surface, the lens adapted to focus an image along a horizontal line on a package label resting on the top surface into the slit;

(d) an optically opaque blocking screen having a transparent opening therein, the opening being located adjacent the first optical lens so as to permit light to pass from the top window through the first optical lens and to block a substantial amount of light which would not pass through the top window and the first optical lens;

(e) a non-coherent light source located between the first optical lens and the top window adjacent to and on either side of the top window;

(f) a diode array located below the lower surface, the array having a plurality of photodiodes of the galium-arsenic type, the photodiodes being arranged longitudinally on a substrate in a single row as an integrated circuit, the photodiodes having windows which have a lens in the longitudinal direction which is greater than two time a spacing between two adjacent diodes and less than four time said spacing, the photodiodes changing their resistances in accordance with amount of light impinging upon them;

(g) a photocell which is provided as a separate element from the photodiodes;

(h) a partially silvered mirror located below the lower surface, the partially silvered mirror being adapted to reflect a portion of light impinging thereon and transmitting a remaining portion of light impinging thereon;

(i) a second optical lens of the convex type, located between the lower surface and the partially silvered mirror, the second optical lens cooperating with the partially silvered mirror to focus the image focused into the slot by the first optical lens onto the diode array and to transmit a portion of the image to the photocells;

(j) a third optical lens of the convex type, located between the partially silvered mirror at the photocell, the third optical lens cooperating with the second optical lens at the partially silvered mirror to focus a portion of the image focused into the slit by the first optical lens onto the photocell;

(k) a shift register operable to register the light sensed by the diodes on the digital array;

(l) a photocell monitoring circuit response to the light sensed by the photodetector;

(m) a pair of elementary detectors, the elementary detectors being second and third photodetectors, the second and third photodetectors each being provided with an optical window to the level of the top surface and arranged so that a package being moved across the top surface covers the optical windows at the top surface sequentially;

(n) timing circuitry, the timing circuitry receiving a signal from the first photocell proportional to the speed that an image transmitted on the photocell changes;

(o) a data processing means, the data processing means receiving signals from the shift register, the photocell monitoring circuit, the speed detection circuit and the timing circuitry, the output of the data processing means corresponding to a pattern of the image along said horizontal line on the package label and the change of the image of the package as the package is moved across the top surface, provided that the output from the data processing means coincides with a code parameter for the UPC Code of the Uniform Grocery Product Code Council wherein UPC Code may be provided on the package label and the UPC Code can be read by the label-scanning apparatus regardless of the axial alignment of the UPC Bar Code along the top surface, provided that the UPC Bar Code is moved across the top surface in a face-down orientation.

14. The label-scanning apparatus of claim 13 further comprising registry apparatus, the registry apparatus comparing the output of the data processing means to an acceptable list of UPC bar codes, and providing sales information.

15. A method for scanning coded labels comprising
(a) moving the labels across a top surface;
(b) illuminating the label through the top surface;
(c) focusing an image of an horizontal line into a slit, the slit being located in a lower surface and the horizontal line being generally transverse to the direction of movement of the label across the top surface;
(d) focusing the image in the slit through a partially silvered mirror onto an integrated circuit array of photodiodes, while causing a portion of the image to be reflected from the partially silvered mirror;
(e) focusing a part of the portion of the image reflected by the partially silvered mirror onto a photocell;
(f) detecting an initial velocity of movement of a package containing a label.
(g) detecting the timing of signals received by the photocell;
(h) detecting the light impinging upon diode array;
(i) providing the velocity signal, the output of the diode array, and the output of the photodetector to a data processing means and comparing the signals received by the data processing means to a code parameter corresponding the UPC Bar Codes.

* * * * *